United States Patent
Zitarosa et al.

(10) Patent No.: US 9,435,236 B2
(45) Date of Patent: Sep. 6, 2016

(54) VALVE FOR CONTROLLING A GAS FLOW, LIQUID SEPARATOR, VENTILATION SYSTEM AND INTERNAL COMBUSTION ENGINE COMPRISING SUCH A VALVE

(75) Inventors: Francesco Zitarosa, Illertissen (DE); Bernd Spaeth, Ulm (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 914 days.

(21) Appl. No.: 13/261,372

(22) PCT Filed: Jan. 20, 2011

(86) PCT No.: PCT/EP2011/000226
§ 371 (c)(1),
(2), (4) Date: Oct. 4, 2012

(87) PCT Pub. No.: WO2011/089006
PCT Pub. Date: Jul. 28, 2011

(65) Prior Publication Data
US 2013/0032115 A1    Feb. 7, 2013

(30) Foreign Application Priority Data

Jan. 20, 2010   (DE) .................... 20 2010 001 191 U

(51) Int. Cl.
*F16K 15/08*     (2006.01)
*F01M 13/04*     (2006.01)
*F01M 13/00*     (2006.01)
(Continued)

(52) U.S. Cl.
CPC .......... *F01M 13/04* (2013.01); *F01M 13/0011* (2013.01); *F01M 13/023* (2013.01); *F16K 15/028* (2013.01); *F16K 17/044* (2013.01); *F16K 17/0413* (2013.01); *F16K 17/0493* (2013.01); *F16K 17/30* (2013.01); *G05D 7/0133* (2013.01); *F01M 2013/0044* (2013.01); *F01M 2013/0055* (2013.01); *F01M 2013/0066* (2013.01); *F01M 2013/0427* (2013.01); *F01M 2013/0433* (2013.01); *F01M 2013/0438* (2013.01)

(58) Field of Classification Search
CPC ............... F01M 13/04; F01M 13/023; F01M 2013/0066; F01M 2013/0044; F01M 2013/0427; F01M 2013/0433; F01M 2013/0055; F01M 2013/0438; F16K 17/30; F16K 17/0493; F16K 15/028; F16K 17/0413; F16K 17/044
USPC ........................................................ 137/511
See application file for complete search history.

(56) References Cited

U.S. PATENT DOCUMENTS 2,198,790 A   4/1940   Roddewig
2,423,592 A   7/1947   Foster
(Continued)

FOREIGN PATENT DOCUMENTS

CN   1394148 A   1/2003
CN   1925902 A   3/2007
(Continued)

*Primary Examiner* — Kevin Lee
*Assistant Examiner* — P. Macade Nichols
(74) *Attorney, Agent, or Firm* — Marshall & Melhorn, LLC

(57) ABSTRACT

The invention relates to a valve for controlling a gas flow, as it is used, for example, for controlling the gas flow between a crankcase and an intake tract of an internal combustion engine. The invention further relates to a liquid separator and to a ventilation system for the above-mentioned exemplary use for a crankcase and to an internal combustion engine.

27 Claims, 14 Drawing Sheets

(51) Int. Cl.
*F01M 13/02* (2006.01)
*F16K 15/02* (2006.01)
*F16K 17/04* (2006.01)
*F16K 17/30* (2006.01)
*G05D 7/01* (2006.01)

(56) References Cited

U.S. PATENT DOCUMENTS

| | | |
|---|---|---|
| 3,111,138 A | 11/1963 | Humphreys et al. |
| 3,308,798 A | 3/1967 | Snider |
| 3,469,565 A * | 9/1969 | Albright et al. ............... 123/574 |
| 4,056,085 A | 11/1977 | Nowroski et al. |
| 5,174,330 A | 12/1992 | Golestan et al. |
| 5,265,643 A | 11/1993 | Golestan et al. |
| 5,697,351 A | 12/1997 | Schumacher |
| 6,418,918 B2 | 7/2002 | Mammarella |
| 6,505,615 B2 | 1/2003 | Pietschner |
| 6,797,040 B2 | 9/2004 | Lenzing |
| 7,080,636 B2 | 7/2006 | Knaus et al. |
| 7,238,216 B2 | 7/2007 | Malgorn et al. |
| 7,677,229 B2 | 3/2010 | Lemke et al. |
| 7,743,742 B2 | 6/2010 | Wagner et al. |
| 7,785,401 B2 | 8/2010 | Wagner et al. |
| 7,799,109 B2 | 9/2010 | Dunsch et al. |
| 8,042,529 B2 | 10/2011 | Meinig et al. |
| 2011/0036242 A1* | 2/2011 | Enderich et al. ............... 96/400 |

FOREIGN PATENT DOCUMENTS

| | | |
|---|---|---|
| DE | 826 085 C | 12/1951 |
| DE | 826085 C | 12/1951 |
| DE | 10 2004 037 157 A1 | 3/2006 |
| DE | 20 2005 009 990 U1 | 11/2006 |
| DE | 10 2005 042 286 A1 | 4/2007 |
| DE | 103 62 162 B4 | 4/2008 |
| DE | 10 2006 051 143 A1 | 5/2008 |
| EP | 0545356 A1 | 6/1993 |
| FR | 1236014 A | 7/1960 |
| WO | 0192690 A1 | 12/2001 |

* cited by examiner

VALVE FOR CONTROLLING A GAS FLOW, LIQUID SEPARATOR, VENTILATION SYSTEM AND INTERNAL COMBUSTION ENGINE COMPRISING SUCH A VALVE

BACKGROUND OF THE INVENTION

The present invention relates to a valve for the control of a gas stream, as it is for instance used for the control of a gas stream between a crank case and a suction tract of a combustion engine. The present valve further relates to a liquid separator as well as a ventilation system for the aforementioned exemplary application for a crank case as well as a combustion engine.

The present invention is for instance used in order to remove oil mist and/or oil droplets from blow-by gases of a combustion engine. To this end, the blow-by gases are conventionally guided from the crank case to the suction tract of the combustion engine via a ventilation line belonging to a ventilation system and this way are recirculated to the combustion process. It is however required to remove oil which has been carried over beforehand from these blow-by gases. The oil which has been carried over can be carried along as oil mist and/or oil droplets in the blow-by gases.

The oil separation is realized in so called oil separators, thus liquid separators for oil mist and/or oil droplets from a gas, here the blow-by gas. Such oil separators in the state of the art use different methods for the separation of the oil mist or the oil droplets, e.g. impaction separation, centrifugal separation or the like.

Depending on the operation conditions of the combustion engine, different gas streams (volumes per minute) have to be ventilated via the ventilation system. With different operation conditions, the pressure difference between the suction tract of the engine and the crank case varies, too. With a high underpressure in the suction tract, this can cause that the crank case is emptied by suction. On the other hand, too small a pressure in the suction tract or an excessive pressure loss in the ventilation line results in an overpressure in the crank case. An overpressure in the crank case relative to the atmospheric pressure is however not admissible.

As a consequence, in the state of the art, in almost every combustion engine, pressure control valves are arranged in the ventilation line, which control the pressure drop in the ventilation system and thus prevent the crank case from an inadmissibly high under- or overpressure. They close if the underpressure on the suction side becomes too high and this way cause an additional pressure drop in the ventilation line.

For the case that only a small underpressure is present in the suction tract or that an inadmissibly high pressure drop occurs in the ventilation line, e.g. by plugging of one of the oil separators arranged there, bypass lines are arranged in the ventilation line, which circumvent the corresponding areas, thus the oil separators. These are closed via bypass valves, which only react and open if the differential pressure of a separator becomes too large.

Such bypass valves can be preloaded, for instance using springs. They provide however no oil separation function.

While uncontrolled systems without bypass line at high volume streams of the blow-by gases cause a high pressure loss at the separator and at small volume streams result in poor separation rates, ventilation systems and oil separator valves with a bypass are very demanding in their construction and therefore also costly. It is especially always required to adapt such systems to the conditions of the respective combustion engine.

DE 103 62 162 B4 shows an oil separation device for a combustion engine, which comprises several constricted passages. Each of the passages shows a gap with variable width of the gap and a large passage cross section of the gap. The gap there is formed in such a way that it acts as an impactor separator for oil carried over in the blow-by gas. In order to control the passage resistance of the valve, the cross sectional area of the section through the gap varies with the pressure difference at the valve.

This state of the art has the disadvantage that such a valve can only be sealed off with difficulty and that an adaptation to various types of engines is very cumbersome. It does not provide for a simple scalability.

BRIEF SUMMARY OF THE INVENTION

It is therefore the object of the present invention to provide a liquid separator or a valve, which does only require little space, has a small number of parts and realizes both a bypass function and a liquid separation function. It is further an object of the present invention to provide for a ventilation system and for a combustion engine using valves or liquid separators according to the invention.

This object is solved by the valve according to claim 1, the liquid separator according to claim 35, the ventilation system according to claim 36 as well as the combustion engine according to claim 37. Advantageous embodiments of the valve according to the invention are given in dependent claims 2 to 34.

The present invention is not limited to the separation of oil mist or oil droplets from blow-by gases, but is generally suited for the separation of liquids from gases.

The valve according to the invention comprises a valve seat with a valve opening, which can be closed by means of a valve closure, e.g. a valve disk. The valve opening in this context may be a single, connected opening or comprise several non-connected openings. The valve closure is seated on a valve bearing. According to the invention, the valve closure itself comprises one or several gas passage openings, which extend from the pressure side of the valve to the suction side of the valve. The gas passage openings themselves already function as liquid separator elements.

The gas passage openings, which are arranged in the valve closure, for example in a valve disk, can be designed in such a way that they are even open when the valve is closed, thus when the valve closure for instance rests on the valve seat. These openings cause that a gas stream can pass through the valve even with a closed valve and that in the passages or when passing through the passage openings, liquid, for instance oil, can be separated. These openings can further be provided with oil separator elements, in order to increase the effect of the liquid separation.

In addition, further gas passage openings can be arranged in the valve closure, which are closed when the valve is closed by the valve seat and which are only opened when a particular pressure difference between the pressure side and the suction side of the valve is exceeded so that the valve closure lifts off from the valve seat. With this, these further gas passage openings in the valve closure are opened in order to allow for a passage of the gas.

Further valve passage openings can be arranged in the valve closure, too, which allow for a permanent passage of the gas stream independent of the condition of the valve itself. Further, further gas passage openings can be arranged in the valve seat, which are closed by the valve closure in the closed state of the valve, thus when the valve closure is seated on the valve seat, and which are opened when the valve closure lifts of from the valve seat.

These gas passage openings can for instance be cylindrical passages or conical passages which are constricted in the gas streaming direction, in the valve closure or in the valve seat, the diameter of which—with conical passages the maximum diameter of which is 0.5 to 5 mm, preferably 0.9 to 3 mm. The valve closure and/or the valve seat is preferably made from plastic material with thermoplastic material being preferred over thermoset material. In this case, the gas passage openings are integrally formed during moulding of the valve closure and/or the valve seat and the length/height of the gas passage opening essentially results from the height of the valve closure or the valve seat, which in general amounts to between 1 to 15 mm, preferably to between 2 and 15 mm. It is also possible to produce the valve closure and/or the valve seat from metal, in particular from metal sheet, especially from steel metal sheet. The gas passage opening in this case can only be formed by a passage in the metal sheet, which has for instance been stamped out. It is however also possible, especially with conical gas passage openings, to form the metal sheet in such a way that constricting protrusions results, the ends of which are torn open, thus comparable to the production of the protrusions of a tanged steel sheet. With metallic valve closures or valve seats, the height of the gas passage openings advantageously amount to between 0.2 and 10 mm, preferably to between 0.5 and 5 mm.

This way a bypass valve and a fluid separator are integrated into the same part according to the invention, which simultaneously causes a reduced number of parts and a small demand in space. The bypass function is realized together with the oil separator function.

Due to the small demand in space and the low number of parts, considerable cost savings result. The valve according to the invention here can be adapted to various functional and constructional demands as it is scaleable given the low number of parts and allows for a modular construction. Depending on the requirements with respect to the pressure differences to be tolerated between the pressure and suction side of the valve, valve closures and valve seats with a different number of gas passage openings can be used. The individual gas passage openings in addition can be designed with different dimensions and therefore allow different gas volume streams to pass. With this, the pressure difference dropping at these gas passage openings can be set, too.

According to the invention, the valve closure can be preloaded elastically, especially resiliently seated, especially preloaded in the direction closing the valve. In this case, the valve closure preloaded by a spring lifts off from the sealing seat at an increased pressure difference at the valve and then allows for a bypass of the gas stream around the gas passage openings.

The present invention allows for a regular compression of the valve closure on the valve seat and therefore for a plane rest on the sealing seat. This further enables a high tightness of the bypass valve.

The elastic seating for the valve closure can be realized using springs, bending beams, as a tongue valve, by means of meander-shaped springs, by means of spiral springs or by means of an elastic rubber disk, too. The choice of the type and dimension of the elastic means for preloading the valve closure in the direction of the valve seat, allows for an adaptation to the properties and characteristics of the respective situation, especially to the respective engine. If a progressive spring is used, the course of the pressure can be further improved. It is also possible to use a degressive spring element in order to achieve a desired pressure course.

Due to the low number of parts and the simple mechanical construction owed to the functional principle, an assembly of the individual parts, in particular of the spring, is possible without the need for any welding processes and the like, e.g. using a snap-fit engagement. As a consequence, the assembly process of the valve according to the invention is very simple and cost efficient.

A further possibility to elastically seat the valve closure on the valve seat results from the use of a valve disk as the valve closure, which valve disk is connected onto or to the valve seat outside of the valve opening. In the area between the connection, which can be concentric around the valve closure, and the valve opening, the valve closure can comprise openings, especially slits, which enable a lift off of the central part of the valve disk from the valve opening after excess of a preset differential pressure between the pressure side and the suction side of the valve. This seating of the valve disk comparable to a disk spring causes that openings, e.g. slits, open up, when the valve disk lifts off from the valve closure and as gas passage openings open a further gas passage path, e.g. a bypass. These slits advantageously are formed as circular arc segments, which encircle the valve opening concentrically.

In order to enable a multi-step lift off of the valve disk and a multi-step opening of additional bypass openings (e.g. slits) dependent on the differential pressure between the pressure and suction side, the valve disk can also comprise several areas with such openings, which areas are radially distanced to each other. Dependent on the design of the openings, the lift off of the most central part of the valve disk from the valve opening takes place first with simultaneous opening of a first perforated area given by the bypass openings. With a further increasing differential pressure between pressure and suction side of the valve, a larger area of the valve disk lifts off from the valve opening and opens further perforated areas situated more remote from the center of the valve disk.

The separation effect at the bypass gap can be set by varying the ratio between the size of the valve closure and the width of the bypass gap. With a small gap and a large valve disk, even under bypass conditions, a separation of oil mist and oil droplets takes place at the bypass gap. With a small valve disk and a large bypass gap, the separation effect is smaller, although the total cross section of the bypass valve to be passed by the gas may be the same as in the aforementioned example.

According to the invention it is possible that liquid separators are inserted into the gas passage openings or formed as one-piece with them. These liquid separator elements then under normal conditions of the valve with a closed valve cause an improved separation of liquid, e.g. an improved separation of oil mist and oil droplets. The liquid separation elements there can be arranged in all or only in a part of the gas passage openings. It is however also possible to arrange separation elements immediately behind the respective gas passage opening, thus on the suction side. Impingement plates or fleece, at which liquids such as oil droplets and oil mist, can be separated after their passage through the gas passage opening are suited for this purpose. The gas passage openings, comparable to nozzles, here form an area in which the gases are accelerated to a higher velocity and thus conditioned for an efficient liquid separation.

It is also possible to arrange such liquid separation elements, for instance impingement plates or fleeces, behind the bypass opening—relative to the gas streaming direction—so that even under bypass conditions a certain liquid separation performance results.

The valve according to the invention can be used as such or as an element in further parts, e.g. as an oil separation valve inserted into a valve cover. Helical elements, which can be realized as described in DE 10 2004 037 157 A1 are suited as liquid separation elements, which can be inserted into the gas passage openings or be formed as one-piece with the gas passage openings.

The liquid separation elements used in the present invention can thus comprise at least one helical segment, the thread face of which together with the inner wall of the gas passage opening forms a helical streaming path for the gas, comparable to the liquid separator elements presented in DE 10 2004 037 157 A1. The helical segment can have a length smaller than or equal to half the pitch of the helical segments and in cases be formed as one piece with the wall element.

According to the invention, it is also possible that two such helical segments are arranged within one gas passage opening one behind the other with respect to the gas passage direction. It is then advantageous for the minimization of the streaming resistance that the consecutive segments show the same direction. It is advantageous for an improvement of the separation performance that they show opposite direction.

If two or more helical segments are arranged behind one another with respect to the gas passage direction in one of the gas passage openings, the outlet-sided edge of the thread face of the helical segment arranged frontwardly in the streaming path and the inlet-sided edge of the thread face of the immediately following helical segment can be rotated relative to each other, preferably by 0°, 45°, 90° or 135°.

In the following, some examples of valves and liquid separators according to the invention are described, especially such ones to be used in inventive ventilation systems and combustion engines. The same or similar reference numbers are used for the same or similar elements, so that their second and further use is not explained.

In the following examples and figures some individual enhancements of the invention are shown in a combination; nevertheless each individual one of these enhancements and each individual one of these elements as such represent an enhancement of the invention, also independent of the other elements of the respective example.

BRIEF DESCRIPTION OF THE DRAWINGS

It is shown in

DETAILED DESCRIPTION OF THE INVENTION

Figure 1A:
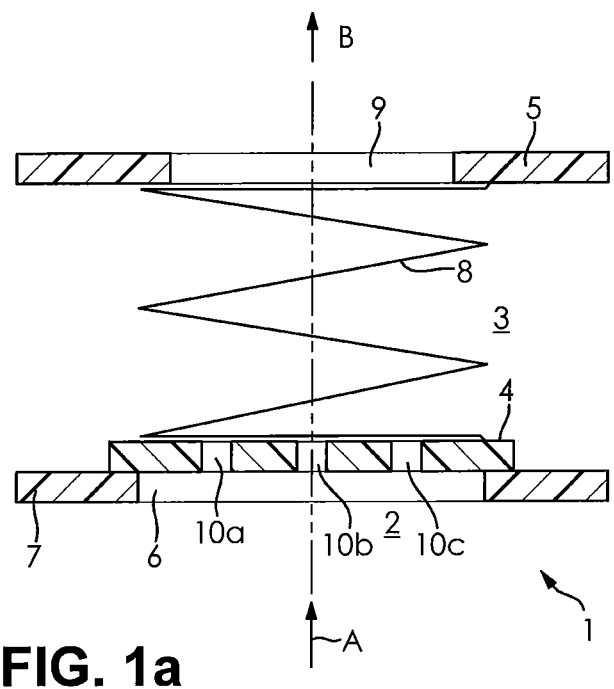
FIGS. 1 to 6 various embodiments of the present invention.

FIG. 1a shows a valve 1, which comprises a basic plate or a valve seat 7. The valve seat 7 comprises a valve opening 6, through which valve opening gas can pass from a first pressure side 2 of the valve to a second suction side 3 of the valve, if a pressure difference is given between the pressure side 2 and the suction side 3 of the valve 1. If necessary, the valve opening 6 is closed by a valve disk 4. This valve disk 4 rests on the valve seat 7. In FIG. 1, the valve disk is supported via a resilient spiral spring 8 on the valve bearing 5, which valve bearing comprises a gas passage opening 9. By means of the spiral spring 8 as a pressure spring, the valve disk is preloaded in the direction opposite to the valve opening, so that the valve disk 4 only lifts off from the valve seat 7 after exceeding a particular pressure difference between the pressure side 2 and the suction side 3 and opens the valve opening 6. It is of course also possible to mount the spring without preload, so that the height of the uncompressed spring under closed condition of the valve exactly corresponds to the distance between the valve disk 4 and the valve bearing 5. An opening 9 is arranged in the bearing 5 of the valve disk, so that gas arriving along arrow A can stream via the valve opening 6 and the opening 9 in the valve bearing 5 in the direction of arrow B. The direction of the arrow at the same time indicates the longitudinal direction of a crankcase ventilation line, into which the valve 1 shown can be integrated in a laterally flush manner.

According to the invention, the valve disk 4 comprises gas passage openings 10a, 10b and 10c, via which even in the closed state of the valve 1, gas can pass from the pressure side 2 to the suction side 3 and then further through the opening 9 of the bearing 5 of the valve disk. These passage openings 10a, 10b and 10c provide for a passage between the pressure side 2 and the suction side 3 with low pressure difference between the pressure side 2 and the suction side 3 and with small volume streams of the gas to be transferred via the valve. Given that the total cross section of the line reduces in these openings 10a, 10b and 10c, these openings also act as nozzles, which provide for a liquid separation function on their own, especially an oil separation function.

Figure 1B:
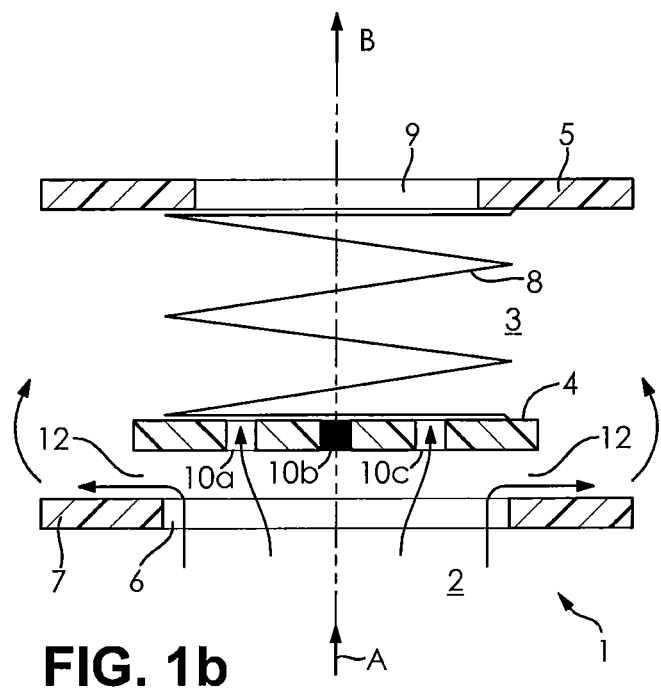

FIG. 1b shows the same embodiment of the valve 1, now however after the opening 10b has been blocked—for what reasons so ever—in the opened state. The arrows indicate that the gas passes through the openings 10a, 10c as well as through the bypass opening 12 of the valve.

This embodiment according to the invention can be enhanced by arranging separate liquid separator elements 11a, 11b, 11c into the gas passage openings 10a, 10b and 10c. The above mentioned helical segments or sequences of such helical segments are suited as liquid separator elements 11a, 11b, and 11c. Of course, these separator elements can be formed as one piece with the valve disk 4. With such an arrangement of additional liquid separator elements 11a, 11b and 11c in the passage openings 10a, 10b and 10c, an improved separation performance of valve 1 in its closed state is achieved.

A simple modular adaptation of the valve according to the invention to the respective characteristics of the particular engine or of the particular gas stream can here be realized by arranging an adjusted number of gas passage openings, which comprise no separator elements and arranging an adjusted number of gas passage openings, into which additional separator elements have been arranged or which are specifically formed as separator elements in the valve disk 4.

Figure 2A:
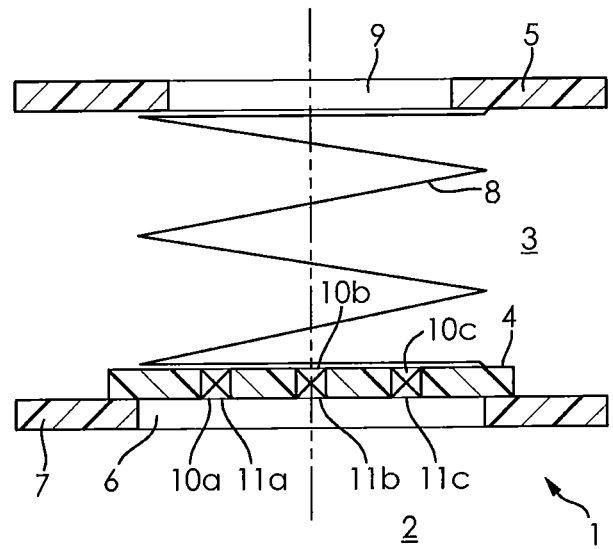
Figure 2B:
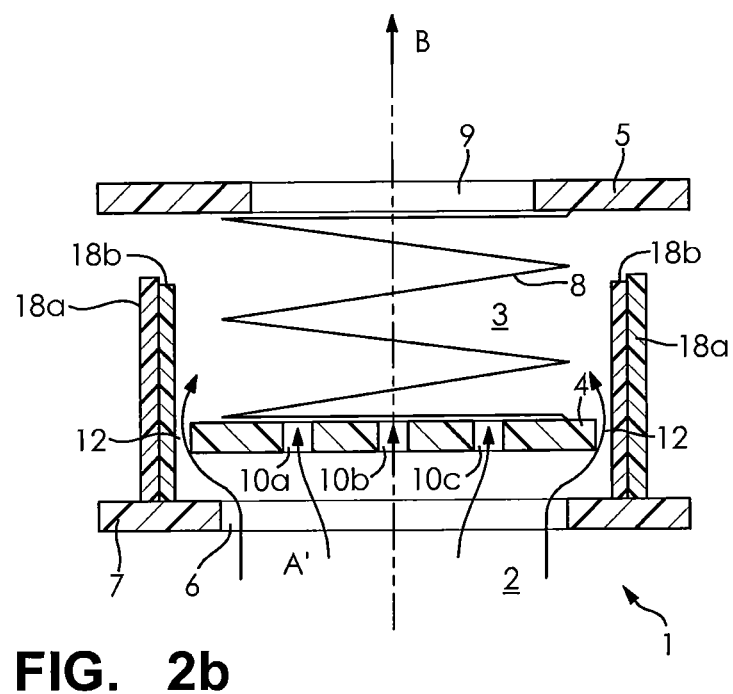

FIG. 2b shows an embodiment, in which the separator elements have not be arranged in the passage openings 10a, 10b and 10c, but in the area of the bypass opening 12. The plates 18 encircle the valve disk 4 in a self-contained manner, so that with an open valve the gases at least in part pass through the bypass and stream over the surface of the plates 18. The plates 18 here are designed two-layered with a permeable fleece layer 18b on a non-permeable layer 18a. The fleece layer 18b is circumferentially arranged on the wall of the plate layer 18a and along the gap-shaped bypass opening 12. Here, the separation is achieved by the oilcarrying gases streaming along the surface of plate 18 and through the surface layer of fleece 18b. Although it would be possible that for the guidance of the valve disk 4, the plates adjoin to the valve disk 4 in a flush manner, the plates 18 in this embodiment keep a small distance from the fleece 18b, so that even with a completely loaded fleece 18b, a passage is still possible.

Figure 3A:
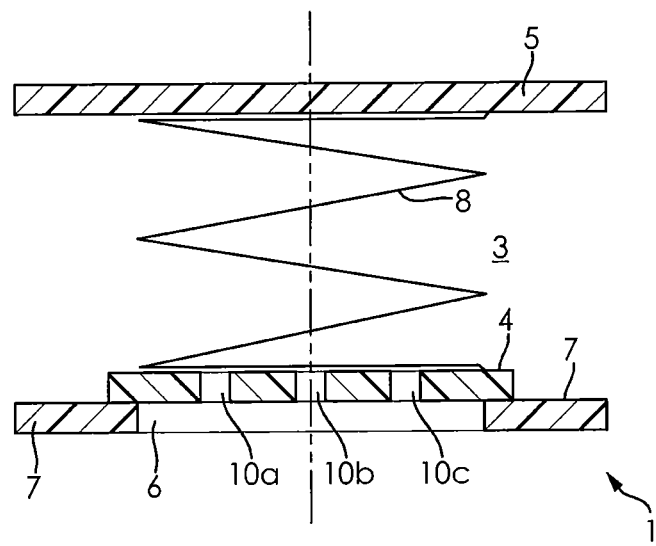

FIG. 3a shows a further embodiment of a valve 1 according to the invention as shown in FIG. 1. Here, however, the bearing 5 of the valve disk is designed without opening 9. The bearing 5 of the valve disk is now formed as a stable permeable fleece or as a mesh web, so that the bearing 5 itself acts as a liquid separator element. It is arranged behind the gas passage openings 10a, 10b and 10c, so that the gas stream having passed the gas passage openings 10a, 10b and 10c and having been accelerated in these gas passage openings 10a, 10b and 10c impacts on the bearing 5 and that there, liquid is separated from this gas stream when passing through the bearing 5.

Figure 3B:
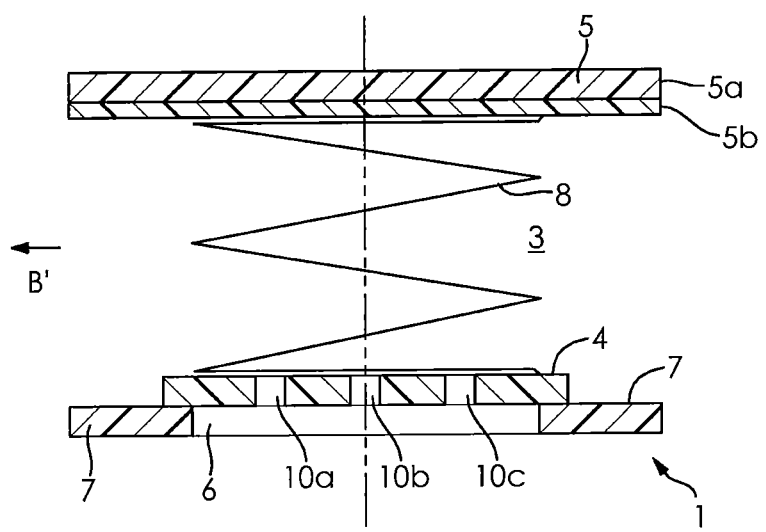

FIG. 3b shows a variation of the previous embodiment, where the bearing 5 for the valve disk comprises a layer 5a which is impermeable for gas and liquid as well as a permeable layer 5b, e.g. a fleece, which faces towards the gas stream. The oil-loaded gases stream to this permeable layer 5b and enter it. The particles are separated in the fleece 5b, the gas re-enters the inner chamber 3 of the valve 1. Other than in the former embodiments, the further transmission of the gas does not take place in continuation of the gas passage direction B through the passage openings 10a, 10b and 10c, but in direction B', thus transverse to direction B, as the bearing 5 of the valve disk is impermeable.

Figure 4A:
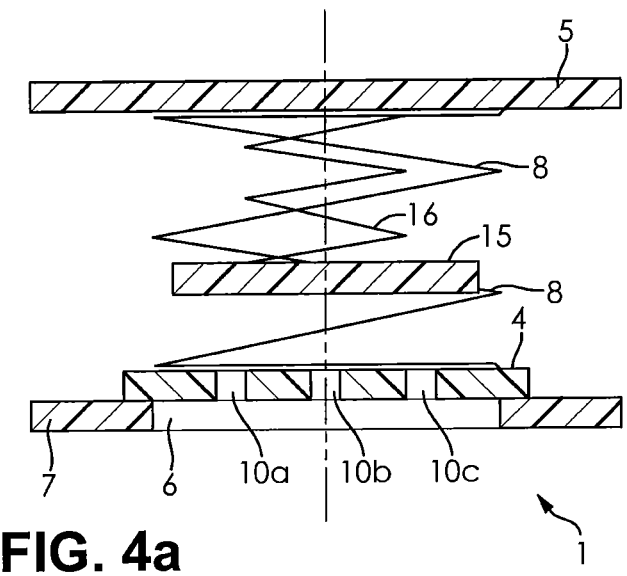

In FIG. 4a, the embodiment of FIG. 3a is varied in such a manner that a further liquid separator element 15 is arranged in the passage direction behind the gas passage openings 10a, 10b and 10c, thus suction-sided to the gas passage openings 10a, 10b and 10c. This further liquid separator element 15 is for instance an impactor plate or a fleece. Instead of a single further liquid separator element 15, it is also possible that distinct liquid separator elements are provided for individual gas passage openings or single groups of gas passage openings or that no liquid separator elements are provided at all.

The further liquid separator element 15 represented in FIG. 4a is also resiliently seated on the valve bearing 5, by means of a spiral spring 16. Dependent on the gas velocity and the magnitude of the gas stream through passage openings 10a, 10b and 10c, the separator element 15 is pressed away from the gas passage openings 10a, 10b and 10c against the spring 16. This results in a variable distance of the separator element 15 from the valve disk 4 and the gas passage openings 10a, 10b and 10c. As a consequence, the degree of separation and the pressure loss caused by the separator element 15 can be controlled dependent on the gas volume stream. As in this embodiment, both springs 8, 16 as well as the magnitude of the plate 15 can be chosen independent of each other, it can be scaled particularly simple and in a versatile manner.

Figure 4B:
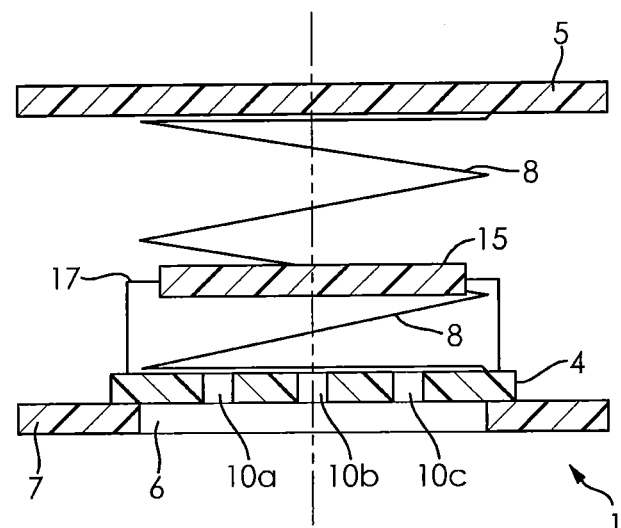

FIG. 4b shows a further variant comparable to the valve represented in FIG. 4a.

In this valve 1, the separator element 15 is not separately seated via a spring. The separator element 15 is rather permanently fixed at the valve disk 4 via connecting rods 17, so that the distance between these two elements 4 and 15 does not change. This allows this valve to be used together with a separator element designed as an impactor separator, where the acceleration in the gas passage opening 10a, 10b and 10c interacts with the impingement on the impactor plate 15. As was the case for the plate 5 in the embodiments according to FIGS. 3a, 3b this plate 15 can be designed one- or multi-layered, permeable or impermeable, too.

Figure 5:
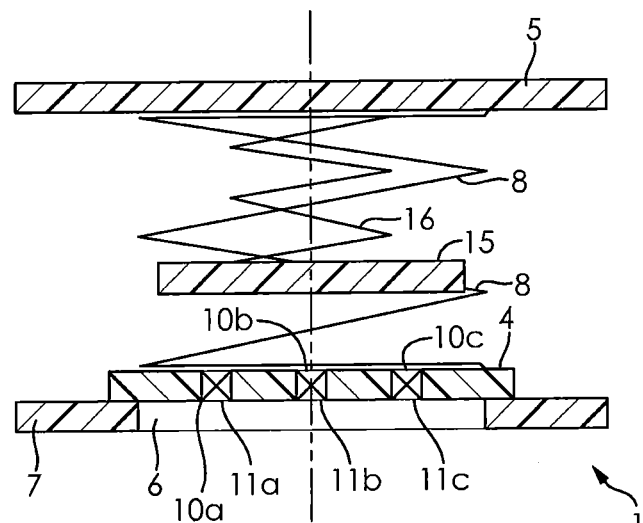

FIG. 5 shows a further embodiment, in which the embodiment according to FIG. 4c is complimented in such a way, that now further separator elements 11a, 11b and 11c are arranged in the gas passage openings 10a, 10b and 10c separately or one-piece with the gas passage openings 10a, 10b and 10c. Due to this, a double liquid separation takes place in the gas passage openings 10a, 10b and 10c and in the further separator element 15 arranged behind the former.

Figure 6:
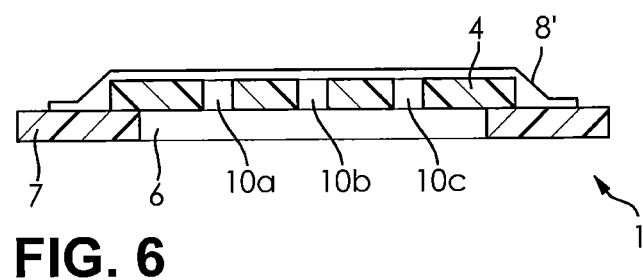

FIG. 6 shows a cross section of a further valve, which in principle corresponds to the construction of the valve 1 in FIG. 1. However, in FIG. 5, the valve disk 4 is not preloaded by a spiral spring, but by means of a resilient metallic tongue 8', which itself is connected to the valve seat 7. In this embodiment, the valve disk 4 can lift off from the valve 7, too, but is preloaded in the direction of the valve seat 7. Here, one has to keep in mind that the metallic tongue 8' does not need to cover the valve disk completely and does not need to close the gas passage openings 10a, 10b and 10c. Rather, it can only be one or several narrow metallic tongues 8', which only in the cross sectional representation seem to also cover the gas passage openings 10a, 10b and 10c. The essential factor is the elasticity in the flank area.

Figure 7:
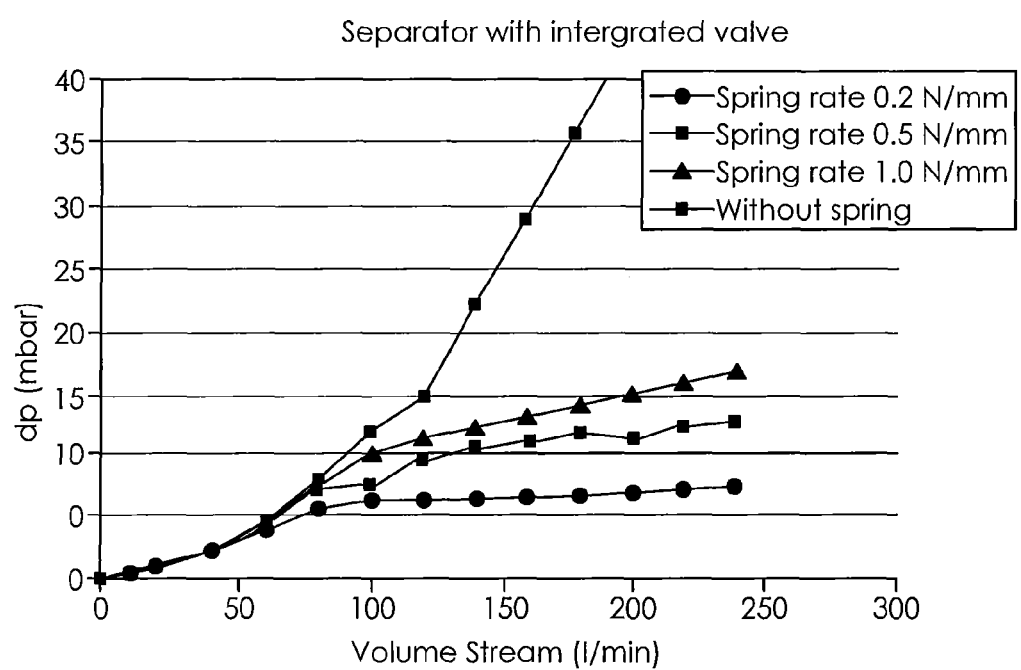
FIG. 7 the pressure drop as a function of the volume stream at a valve according to the invention as shown in FIG. 1, at various spring rates or with fixed valve closure for seating of the valve disk.

FIG. 7 shows the course of the pressure drop at the valve 1 of FIG. 1, four different valves have been measured. On the one hand, a valve with fixed seating has been measured (graph "without spring"). With an increasing volume stream, here the pressure drop at the valve strongly increases.

The other three valves comprise a resilient, moveable seating as in FIG. 1, where different spring rate of spring 8 having been chosen.

As is obvious in FIG. 7, for the valves with a resilient seating, the pressure drop initially increases with increasing volume stream as for the valve with fixed valve disk, however a further increase of the pressure drop is limited. This limitation is achieved by a lift-off of the valve disk 4 from the valve seat 7 and the release of a gap between the valve opening 6 and the valve disk 4, which results in a bypass of the valve disk 4. One can see from FIG. 7 that this lift-off of the valve disk already happens at a gas volume stream of about 60 l/min when the spring with the lowest spring rate of 0.2 N/ml is used, while with the use of a spring with a higher spring rate (0.5 N/mm or 1.0 N/mm), such a lift-off only happens at about 80 to 100 l/min. Thus, by choosing a suitable spring, the characteristics of the valve can be chosen.

Figure 8:
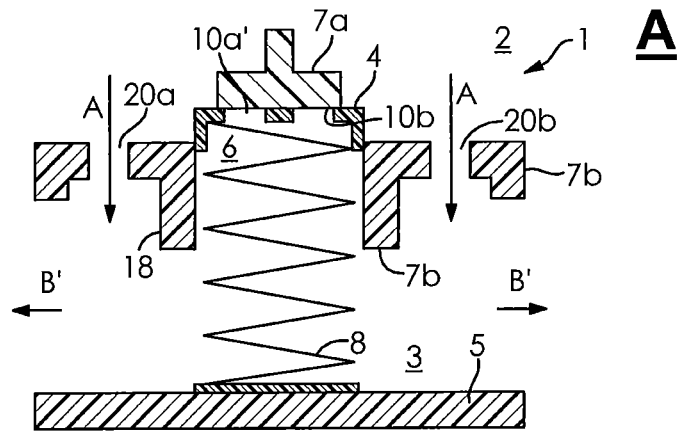
FIGS. 8 to 17 various further embodiments of the present invention.
Figure 8:
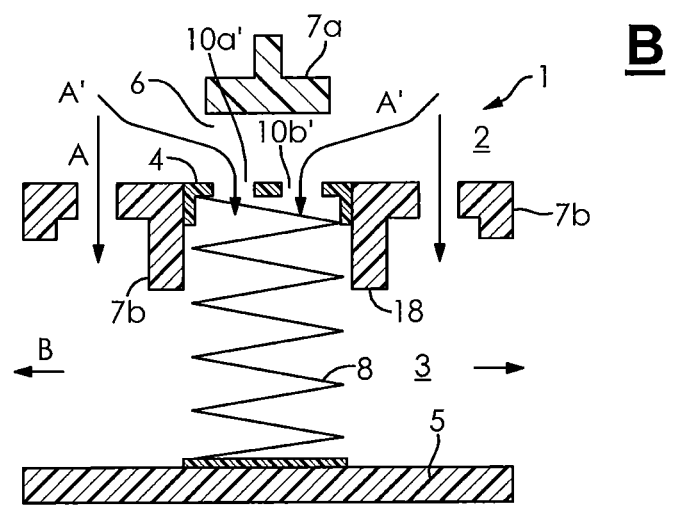
Figure 8:
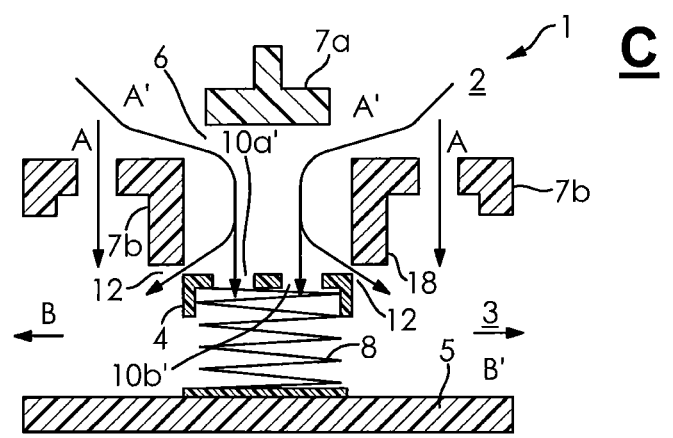

FIG. 8 in three partial Figures A, B and C shows a further variant of a valve 1 according to the invention. The representation in FIG. 8 shows a sectional view, but as a top-view with respect to spring 8. This valve 1 possesses a valve seat, which comprises two partial elements 7a and 7b. The valve seat comprises a central element 7a, on which the valve closure rests when the valve is closed. The valve closure is preloaded by spring 8 in the direction of the valve seat element 7a. The valve seat comprises a further element 7b, which comprises a wall 18, inside of which the valve seat 4 is guided. The element 7b of the valve closure comprises gas passage openings 20a and 20b, which are permanently open and allow for a gas stream via the valve in the direction of arrow A and further in the direction of arrow B'. Already in these openings 20a and 20b, which cause a reduction of the streaming cross section, a fluid carried along with the gas stream, e.g. oil, is separated.

The valve closure 4 itself comprises gas passage openings 10a' and 10b', which in the closed state of the valve 1 are however closed since the valve disk 4 rests on the element 7a of the valve seat. This state is shown in FIG. 8A.

When the pressure difference between the pressure side 2 and the suction side 3 of the valve now exceeds a predetermined limit, the valve closure 4 lifts off from element 7a against the preload of the spring 8 and this way opens the openings 10a' and 10b' as further gas streaming paths. These further gas streaming paths are indicated with arrows A' and shown in FIG. 8B.

If the pressure difference between the pressure side 2 and the suction side 3 of the valve 1 further increases and limits a predetermined limit, the valve disk 4 is pressed out of the valve seat 7b against the preload of the spring to such an extent, that a further bypass opening 12 results between the valve disk 4 and the wall 18 of the valve seat element 7b, through which further gas can stream. This is shown in FIG. 8c.

With such an arrangement and design of the valve 1, it is possible to achieve a multi-step switching behaviour of the valve 1.

Figure 9:
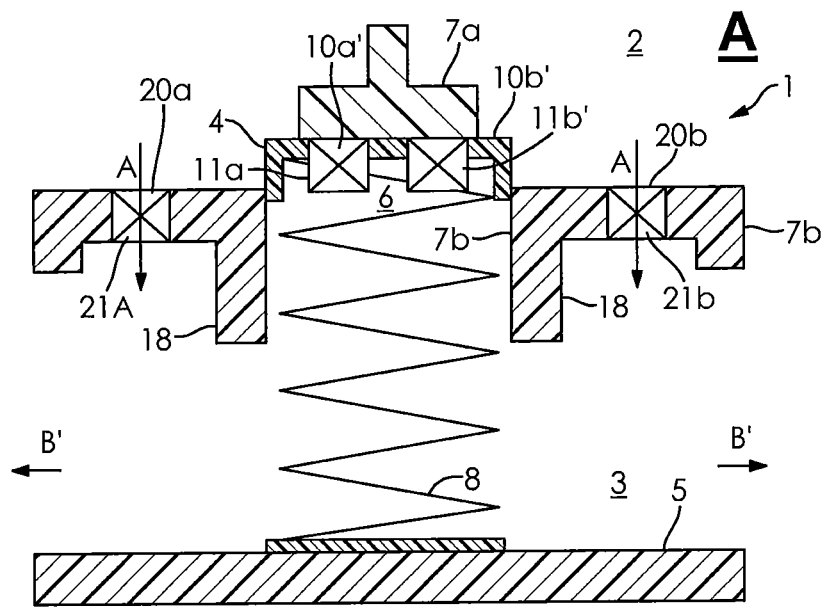
Figure 9:
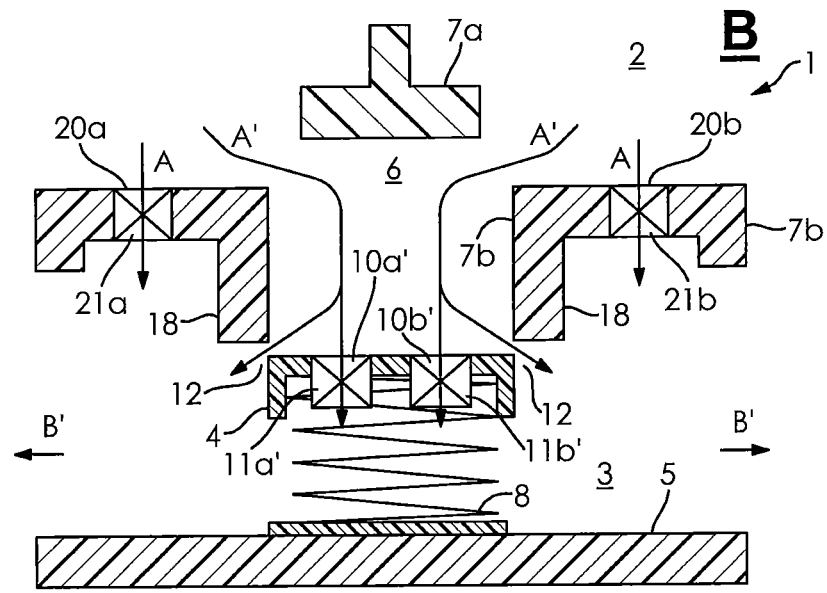

In FIG. 9 a fundamentally similar valve 1 as in FIG. 8 is shown, in which here however the openings 10a' and 10b' for a further increase of the liquid separation effect, separator elements 11a' and 11b', as shown above, are inserted. In the openings 20a and 20b, liquid separator elements 21a and 21b are inserted too, in order to increase the liquid separation efficiency and rate of separation. The representations in FIGS. 9A and 9B relate on the one hand to a condition, in which the valve 1 is closed (FIG. 9A corresponding to FIG. 8A) and in which the valve is completely open (FIG. 9B corresponding to FIG. 8C), respectively.

Figure 10:
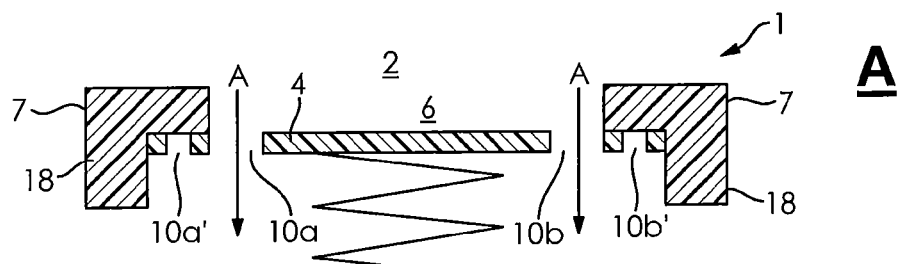
Figure 10:
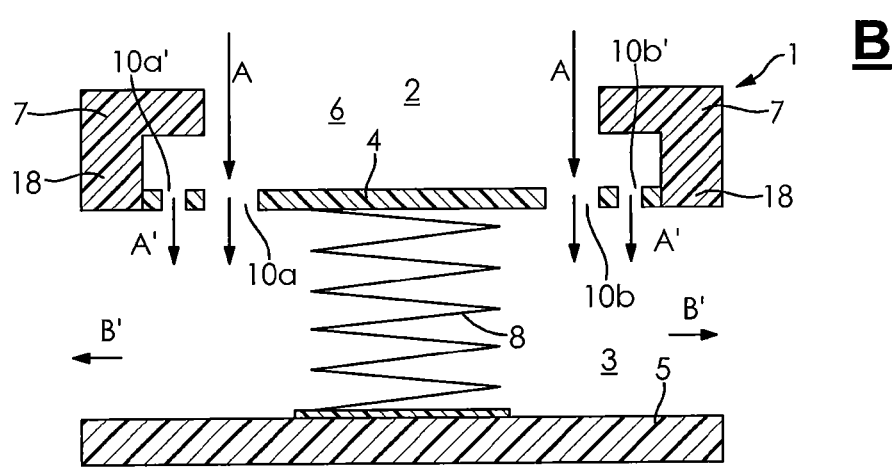
Figure 10:
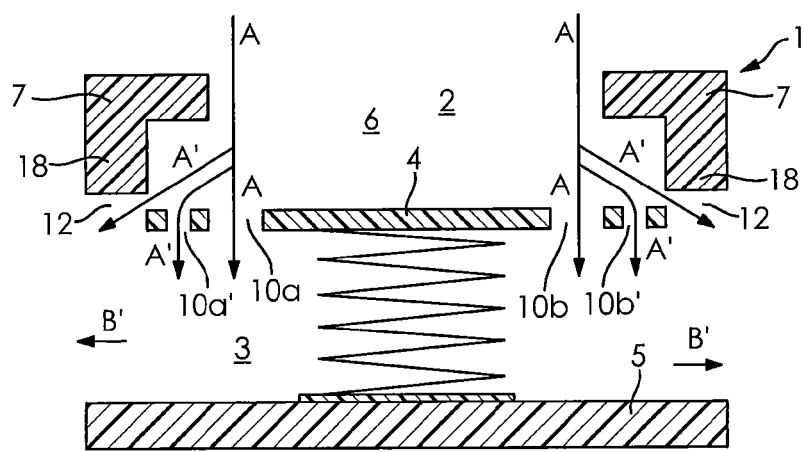

FIG. 10 shows a further valve 1 according to the invention, in which the valve seat 7 is designed as one piece and which comprises a wall 18. In this wall 18, a valve closure 4 is guided. In the area, in which the valve closure rests on the valve seat 7 when the valve is closed, openings 10a' and 10b' are arranged in the valve disk 4, which are provided as gas passage openings. In the closed state of the valve 1, as it is shown in FIG. 10A, these openings are closed by the valve seat 7. In addition, openings 10a and 10b are arranged in the valve closure 4. They are positioned inside of the valve opening 6, so that they are permanently open for gas passage even with a closed valve 1. They thus enable the gas passage along the arrows A and B' in case of a low pressure difference between the pressure side 2 and the suction side 3 with a closed valve 1.

FIG. 10B shows the same valve 1, now however with an increased pressure difference between the pressure side 2 and the suction side 3, where the valve disk 4 already lifts off from the valve seat 7, but is still guided within the wall 18 of the valve seat 7. Here, the openings 10a' and 10b' are additionally open for the gas passage in the direction of the arrows A', so that the pressure drop at the valve disk is reduced overall and the volume stream is increased.

FIG. 10C shows the state of the valve 1 with completely open valve disk 4. This has now lifted off from the valve seat 7 against the force of the spring 8 to such an extent that a further annular opening 12 results as a bypass opening with gas passages A' between the circumferential edge of the valve disk 4 and the wall 18.

Figure 11:
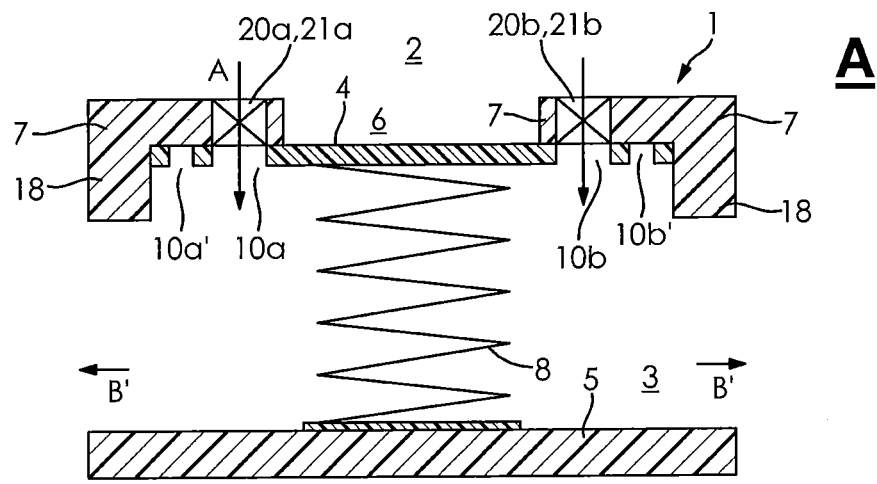
Figure 11:
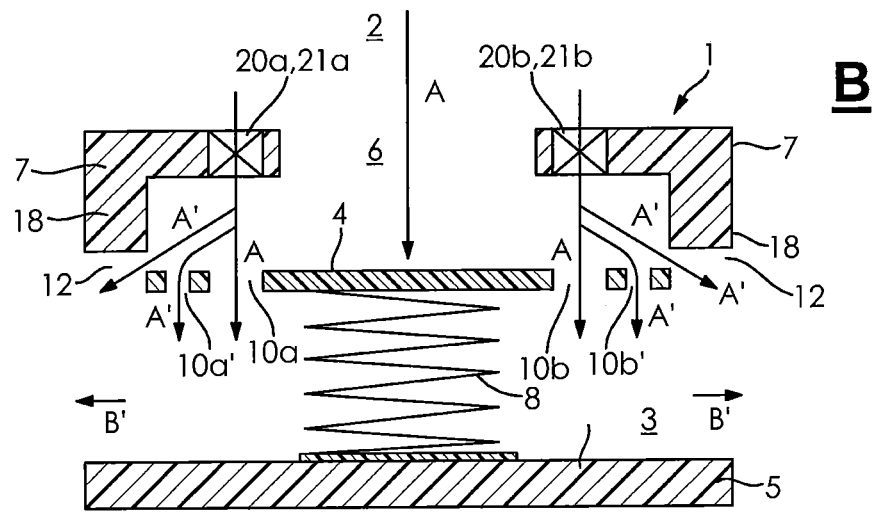

FIG. 11 shows a further example of a valve according to the invention, which generally shows a comparable construction to the valve in FIG. 10. However, now the openings 10a and 10b of the valve closure are generally arranged outside of the valve opening 6. However, the valve seat 7 itself, in the area of the openings 10a and 10b, comprises openings 20a and 20b, which together with the openings 10a and 10b enable a gas path from the pressure side 2 to the suction side 3 of the valve 1 even at closed valve 1, thus when the valve closure 4 rests on the valve seat 7. In order to increase the separation effect, an oil separation element 21a and 21b, respectively, is arranged in each of the openings 20a and 20b, respectively.

FIG. 11A now shows the condition of the valve 1, when it is closed to the highest extent possible. Then, only the passage openings 20a, 10a and 20b, 10b, respectively, are open for a gas passage. Nevertheless, an efficient liquid separation already takes place here.

In FIG. 11B, the state is shown in which the valve disk 4 has lifted off from the valve seat 7 to the highest extent possible. Then, it is not only the openings 10a' and 10b', which are open as gas streaming paths along arrows A' (in the way it was shown in FIG. 10B), but also a further annular bypass-opening 12 between the wall 18 and the valve disk 4 for the gas passage along arrows A'. The representation in FIG. 11B corresponds to the one for the valve in FIG. 10C.

Figure 12:
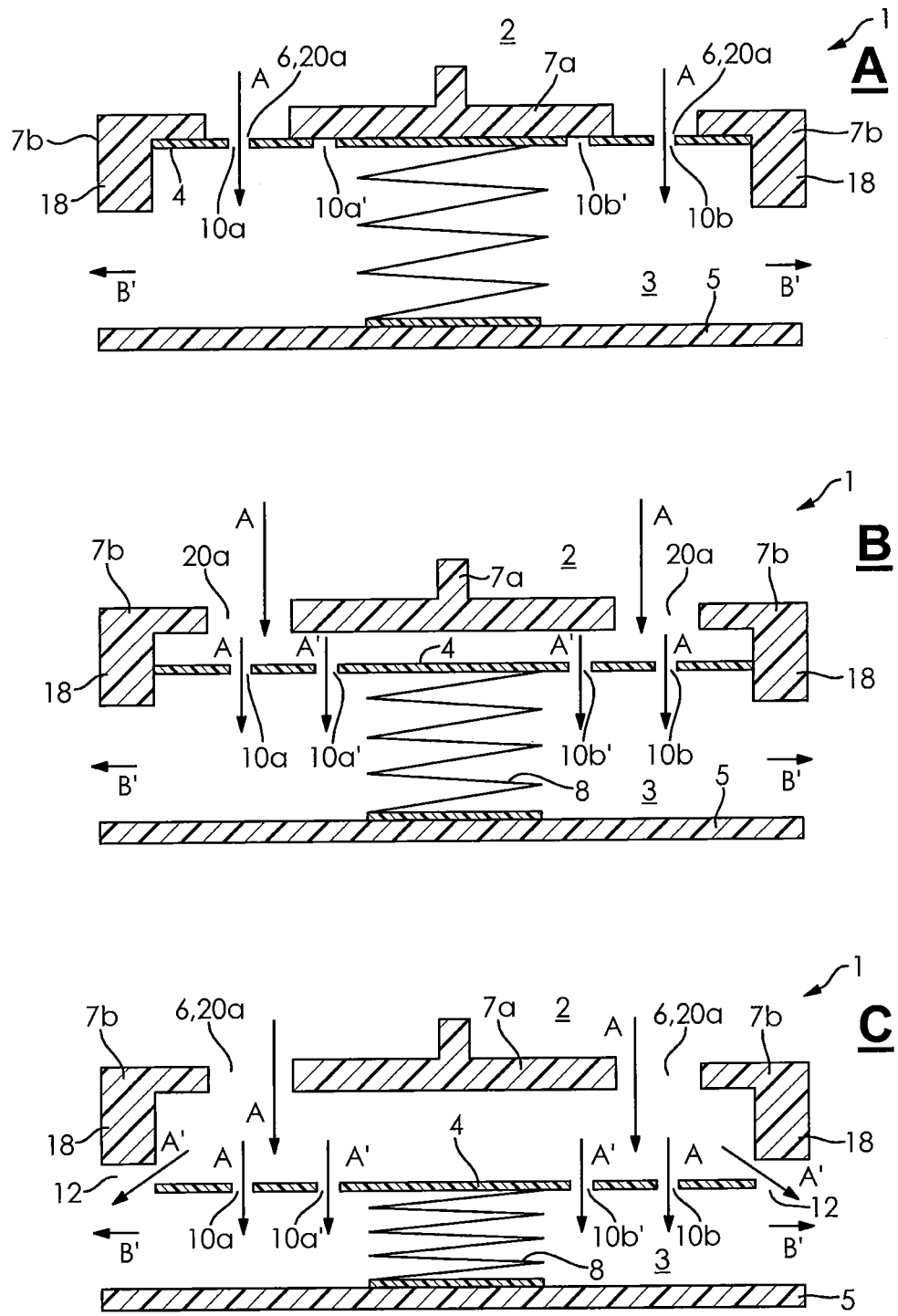

FIG. 12 shows a further valve according to the invention. Similar as for the valve shown in FIG. 8, the valve seat is constructed with two-parts in the form of a center element 7a and an edge element 7b. The valve opening 6 here comprises the shape of a concentric opening 20a, which encircles the center element 7a. The edge element 7b comprises a wall 18, which serves for the guidance of the valve closure 4. The valve closure 4 here comprises several openings 10a and 10b, which are arranged in the area of the valve opening 6, 20a and which are therefore open for the gas passage along arrow A (see FIG. 12A) in every condition of the valve. The openings 10a, 10b may have the shape of separate, elongated annular sections on a line concentric to the opening 20a.

FIG. 12A shows the valve 1 in the maximum closed condition, thus when only openings 10a and 10b are in the open state. FIG. 12B shows the valve 1 when the pressure difference between the pressure side 2 and the suction side 3 exceeds a first predefined pressure, so that the valve closure 4 lifts off from the valve seat 7a, 7b against the preload of the spring 8.

In the area of the central valve seat element 7a, the valve closure 4 shows further openings 10a' and 10b', which rest on element 7a and therefore are closed by this element 7a, if the valve is closed to the highest degree, as shown in FIG. 12A. These openings are opened for a gas stream in the direction of the arrows A' when the valve closure 4 lifts off from the valve seat 7a, 7b, as shown in FIG. 12B. In FIG. 12B, the valve closure is additionally guided by the wall 18 of the valve seat element 7b.

If the pressure difference between the pressure side 2 and the suction side 3 of the valve exceeds a second predefined value, the valve closure 4 lifts off from the valve seat 7a, 7b against the preload of the spring 8 to such an extent that between the circumferential edge of the valve closure 4 and the wall 18, a further annularly shaped bypass opening 12 is opened, through which gas can stream from the pressure side 2 to the suction side 3 in the direction of arrows A'. In this condition, the valve is opened to the maximum extent, as is shown in FIG. 12C. By the choice of the load-deflection line of the spring 8 as well as the length of the wall 18 in the gas passage direction, it is possible for this valve (in the same way as with valves 1 depicted in FIGS. 8 to 11) to regulate at which pressure difference between the pressure side 2 and the suction side 3 of the valve, gas passage openings, here the openings 10a' and 10b', are opened and at which further pressure difference the openings 12 are opened, too.

Figure 13:
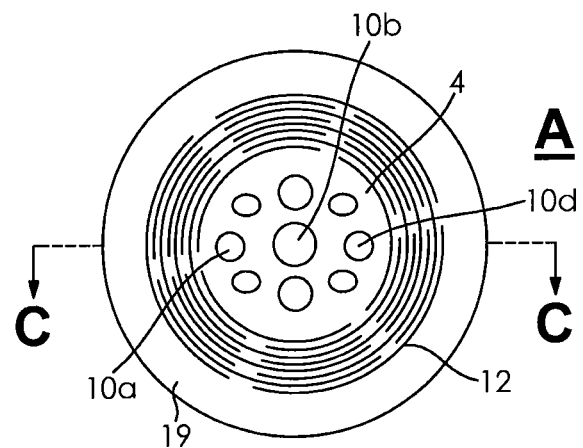
Figure 13:
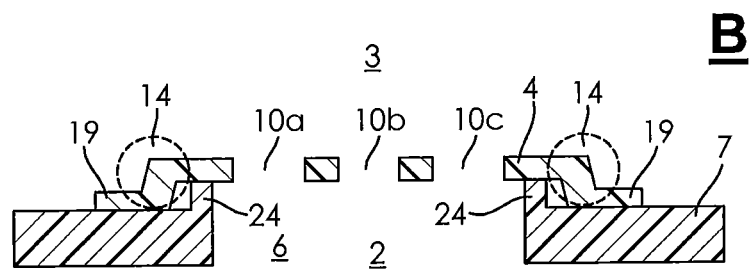

FIG. 13 in partial Figure A in a top view and in partial Figure B in a cross section shows a further valve 1 according to the invention. FIG. 13A here shows the valve closure 4 in a top view, while FIG. 13B shows the valve closure in a section along line C-C in FIG. 13A.

The valve seat 7 comprises a central valve opening 6, which is covered by the valve closure 4. The valve closure 4 shows fastening areas 19 which are situated radially peripherally, by means of which it is mounted to or on the valve seat 7. In the center area, which is preloaded via a step 14 in the area 14 with respect to the fastening area 19, the valve closure 4 comprises openings 10a, 10b, and 10c, which are permanently open for the passage of the gas from the pressure side 2 to the suction side 3. They ascertain a basic gas stream via the valve and with the constriction of the streaming cross sections in the openings 10a, 10b and 10c already provide for a basic liquid separation. This central area within the step 14 is seated on a flange 24, which is arranged in such a way that it protrudes from the valve seat 7 in the gas streaming direction and encircles the valve opening. With a closed valve 1, the valve closure 4 rests on the flange 24, so that only the openings 10a, 10b and 10c are open for the passage through the valve 1.

In the stepped area 14 of the valve closure 4, here slits are arranged as segments of circular arcs which are arranged concentrically around the center of the opening 10b or the center of the valve opening 6. These slits have been produced by punching or cutting out, e.g. by laser cutting, in the valve closure 4 and therefore permanently show an opening. When a predefined pressure difference between the pressure side 2 and the suction side 3 is exceeded, the central area of the valve closure 4 lifts off from the flange 24, which causes that the slits are opened as bypass openings 12. These slits thus cause that the valve closure 4 with its central area is seated comparable to a disk spring on the valve seat 7 and at the same time that due to the opening of the slits 12 at the lift off a bypass function with simultaneous liquid separation is guaranteed.

Figure 14:
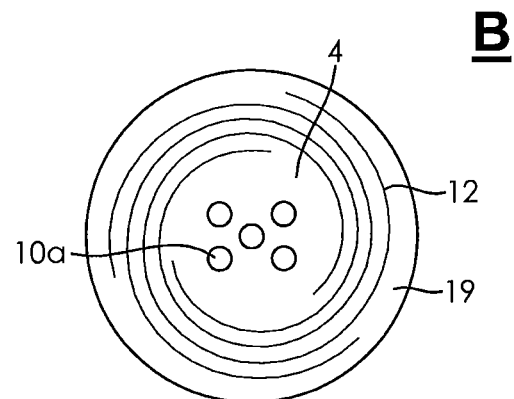

FIG. 14 shows a further example of such a valve closure 4. It is obvious, that here the slits 12, which provide for the spring effect of the bridges between them as well as for the bypass function by themselves, are given in a smaller quantity but with a longer length than the slits 12 in the valve closure 4 of FIG. 13.

Figure 15:
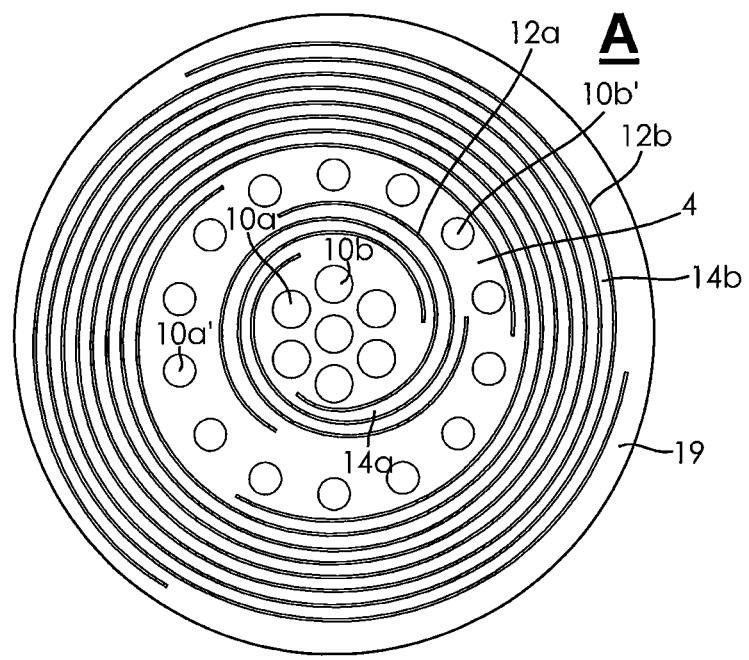
Figure 15:
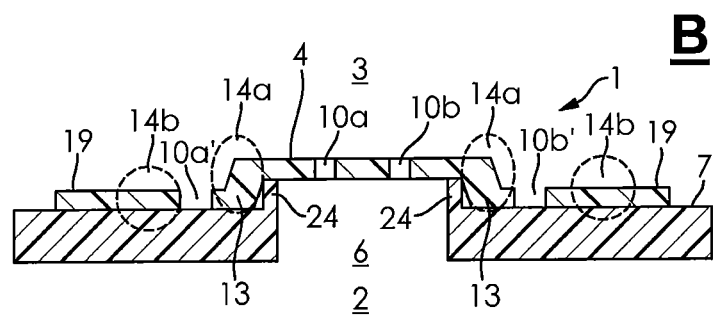

FIG. 15 in partial FIGS. 15A and 15B in a top-view and in a cross section, respectively, shows a further comparable valve 1 in FIG. 15B and its valve closure 4 in FIG. 15A.

The valve closure now in the central area comprises openings 10a and 10b which are permanently open for the gas passage. They are encircled by a first cohort of slits 12a in an area 14a with a step 13. Upon excess of a first differential pressure between the pressure side 2 and the suction side 3 of the valve 1, this central area with the openings 10a and 10b lifts off from the valve seat 7 and the flange 24, so that the slits 12a are released, open up and release bypass openings for the gas stream.

The cohort of slits 12a outside of the valve opening 6 is enclosed by the gas passage openings 10a', 10b' etc. mentioned. In the most closed state possible of the valve 1, they rest on the valve seat 7 and are not open for the gas stream because the valve closure 4 rests on the flange 24. Radially further peripherally, outside of the gas passage openings 10a', 10b', a further cohort of slits 12b is situated, which opens upon excess of a further, higher pressure difference between the pressure side 2 and the suction side 3 and which lifts off the central area including the openings 10a', 10b' from the valve seat 7 and at the same time releases further bypass openings 12b for the gas stream.

Figure 16:
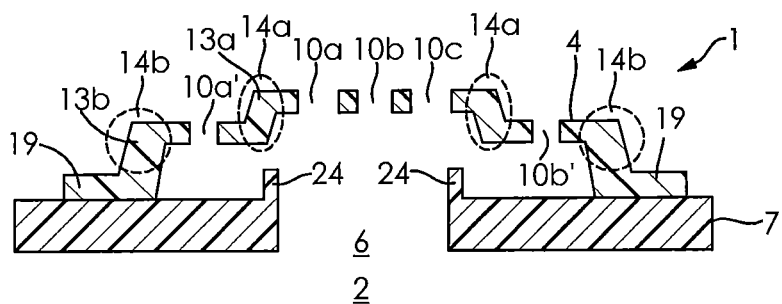

FIG. 16 shows a further valve 1 comparable to the one in FIG. 15, in which permanently open gas passage openings 10a, 10b and 10c are arranged in the central area within a first cohort of slits in the area 14a and in which further, non-permanently open gas passage openings 10a' and 10b' are arranged between this first cohort of slits in an area 14a and a second cohort of slits in an area 14b. In FIG. 16, the valve 1 is depicted in a condition in which due to a sufficiently high pressure difference between the pressure side 2 and the suction 3, the area between the slit areas 14a and 14b has already lifted off from the valve seat 7, so that the openings 10a' and 10b' have been released. By means of the steps 13a and 13b in the areas 14a and 14b, a stepwise opening behaviour of valve 1 is achieved, too.

Figure 17:
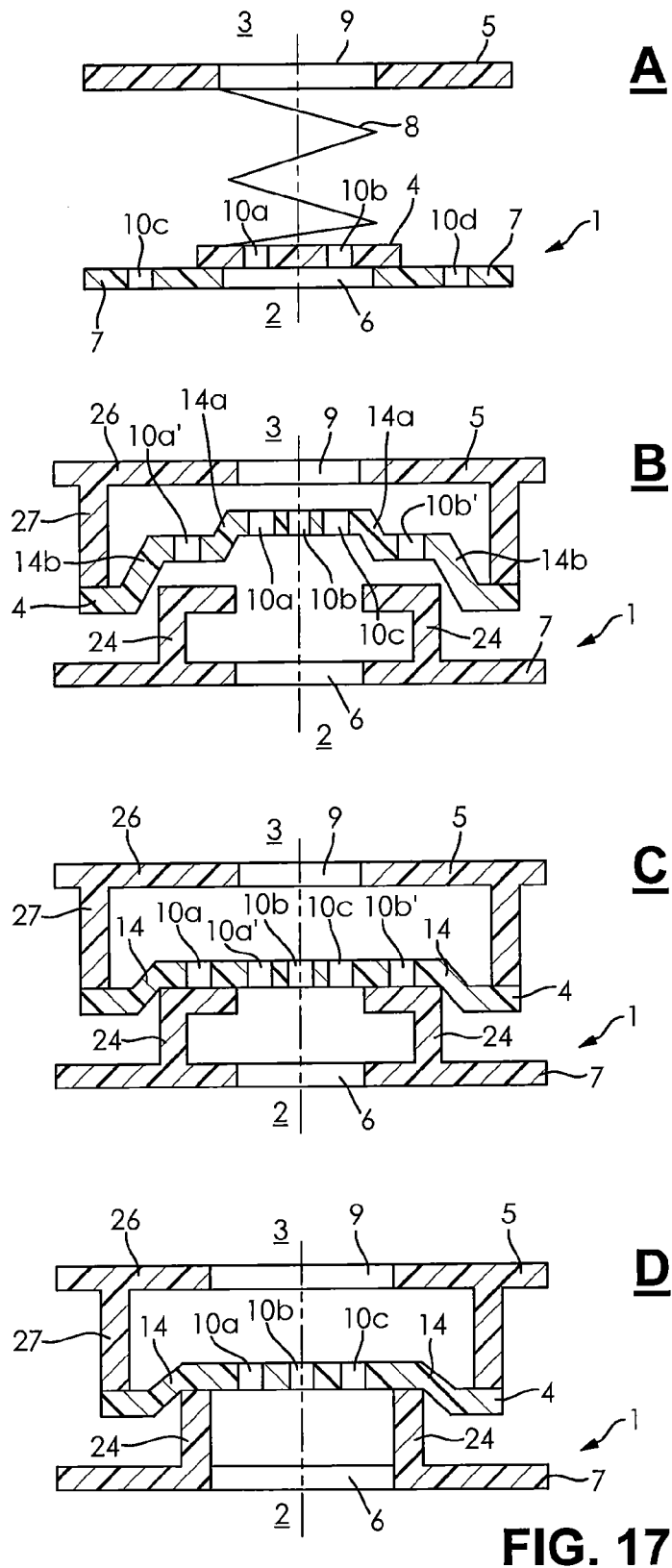

FIG. 17 shows in partial figures A, B, C, and D four further valves according to the invention.

In FIG. 17A, a valve is represented which is constructed comparable to the valve in FIG. 1a. In contrast to the valve shown in FIG. 1a, here the valve seat 7 shows further gas passage openings 10c, 10d, which are permanently open independent of the opening condition of the valve or the valve opening 6. These openings 10c and 10d together with the openings 10a and 10b provide that even in the case of a closed valve, thus when the valve closure 4 rests on the valve seat 7, a minimum passage through the valve 1 is always guaranteed for.

FIG. 17B shows a valve 1, which is constructed comparable to the valve in FIG. 15 or in FIG. 16. The valve seat again shows a flange 24, which here in FIG. 17B is however angled. The upper surface of the angled area pointing towards the valve closure 4 in the closed state of valve 1 serves as a seating area for the valve closure 4. If the valve closure 4 completely rests on this seating surface of the flange 24, only the openings 10a, 10b and 10c are open for the gas passage.

In contrast to FIGS. 15 and 16, but comparable to FIG. 17A, the valve closure 4 now is not seated on the valve seat 7, but on a valve bearing 5 which is separate from the latter. This valve bearing comprises a passage opening 9, through which the gases can pass towards the suction side.

The valve bearing 5 itself comprises a flange 27 projecting rectangularly, which is seated on the valve closure 4 at its outer edge. The further design of the valve closure 4 corresponds to the one in FIGS. 15 and 16, especially with respect to the slit areas 14a and 14b.

If the valve closure 4 now lifts off from the surface of the flange 24, the further gas passage openings 10a' and 10b' are opened for the gas passage. Further, a gas stream can form between the flange 24 and the valve closure 4, which circumvents the valve bearing 5 in the direction of the suction side 3. In both cases, bypass paths open for the gas stream.

In FIG. 17C, a similar valve 1 is shown as in FIG. 17B. This valve in FIG. 17c in contrast to FIG. 17B is however not shown in the open state but in the closed state, in which the valve closure 4 rests on the surface of the angled area of the flange 24 so that both the openings 10a' and 10b' are closed and the gas path for the bypass of the valve bearing 5 is no longer available.

FIG. 17D shows a further valve 1, which to a large extent corresponds to the one in FIGS. 17B and 17C. In contrast to the valve in FIGS. 17B and 17C, the flange 24 shows no angled area. Rather, the valve closure rests on the end of flange 24. Further, the valve closure does not comprise passage openings outside of the area of the valve opening 6, which are open or close as a function of the opening condition of the valve 1. The openings 10*a*, 10*b* and 10*c* arranged in valve closure 4 are permanently open and guarantee a minimum gas passage through valve opening 6, the passage openings 10*a*, 10*b* and 10*c* and the opening 9 from the pressure side 2 to the suction side 3 of the valve 1.

The invention claimed is:

1. A valve for a control of a gas stream from a pressure side to a suction side of the valve, with a valve seat, with at least one hole passing from the pressure side to the suction side as a valve opening, a valve closure, where the valve opening can be closed by the valve closure, and a valve bearing, on which the valve closure is resiliently seated, with the valve closure lifting off from the valve seat upon excess of a predetermined pressure difference between the pressure side and the suction side and with the valve closure comprising at least one gas passage opening reaching from the pressure side to the suction side of the valve, wherein second fluid separating elements are arranged behind the at least one gas passage opening in a streaming direction of a gas on the suction side of the valve.

2. The valve according to claim 1, wherein the second fluid separating elements are impactor elements, comprising impaction plates or fleece.

3. The valve according to claim 1, wherein at least one of the second fluid separating elements can be moved with a varying distance relative to the respective upstream gas passage opening.

4. The valve according to claim 3, wherein at least one of the moveable second fluid separating elements are seated with a preload that upon excess of a predefined pressure difference between the pressure side and the suction side of the valve, they move away from an upstream passage opening.

5. The valve according to claim 4, wherein the preloaded seating of the second fluid separating elements is achieved by means of a pressure spring.

6. The valve according to claim 1, wherein the at least one gas passage opening is open for a gas passage from the pressure side to the suction side while the valve is closed, with the at least one gas passage opening being arranged adjacent to the valve opening.

7. The valve according to claim 1, wherein the valve seat comprises at least one further gas passage opening adjacent to the valve opening.

8. The valve according to claim 7, wherein at least one further gas passage opening is open for a gas passage from the pressure side to the suction side while the valve is closed, with the at least one further gas passage opening being arranged laterally outside the valve closure with the valve closure being located on the valve seat.

9. The valve according to claim 7, wherein the at least one further gas passage opening is closed for a gas passage from the pressure side to the suction side while the valve is closed, and the at least one further gas passage opening being arranged adjacent to the valve opening and being closed by the valve closure.

10. The valve according to claim 7, wherein the at least one further gas passage opening is located adjacent to the valve closure in such a manner that the at least one further gas passage opening forms a common gas passage path.

11. The valve according to claim 1, wherein the valve closure comprises a fastening area, with the fastening area connecting the valve closure to the valve bearing with the valve closure comprising slits in an area between the valve bearing and the valve opening and/or in an area or the valve opening.

12. The valve according to claim 11, wherein the slits are formed as sections of circular arcs concentrically located around the valve opening.

13. The valve according to claim 1, wherein there are more than one gas passage openings and they have the same streaming resistance.

14. The valve according to claim 1, wherein the at least one gas passage opening is formed as a nozzle.

15. The valve according to claim 1, wherein the valve closure is pre-loaded in such a way that the valve opens upon excess of a predefined pressure difference between the pressure side and the suction side of the valve.

16. The valve according to claim 15, wherein upon excess of a first predefined pressure difference at least one further gas passage opening in the valve seat and/or in the valve closure, in the valve closure or between the valve seat or the wall, respectively, and the valve closure opens.

17. The valve according to claim 16, wherein said at least one further gas passage opening is a slit.

18. The valve according to claim 17, wherein upon excess of a second predefined pressure difference with the second predefined pressure difference being higher than the first predefined pressure difference, a further slit in the valve closure or between the valve seat or the wall, respectively, and the valve closure opens.

19. The valve according to claim 1, wherein the valve closure is biased by a pressure spring.

20. The valve according to claim 19, wherein a force-deflection curve of the pressure spring at compression and thus opening of the valve shows a progressive course.

21. The valve according to claim 17, wherein behind the slit between the valve opening and the valve outlet with respect to the streaming direction of the gas, further separating elements are arranged along the slit between the valve opening and the valve closure or along an edge of at least one of the valve opening and the valve closure.

22. The valve according to claim 21, wherein the separating elements are impactor plates or fleece.

23. The valve according to claim 21, wherein at least one of the further separating elements can be moved with a varying distance relative to the valve opening.

24. The valve according to claim 22, wherein at least one of the moveable further separating elements is arranged in a pre-loaded manner and that the at least one separating element upon excess of a predefined pressure difference between the pressure side and the suction side of the valve moves away from the upstream valve opening.

25. The valve according to claim 24, wherein the pre-loaded bearing of the further separating elements is achieved by means of a pressure spring.

26. The valve according to claim 1, wherein said valve closure is a valve disk.

27. The valve according to claim 1, wherein there are more than one gas passage openings and the streaming resistance varies among them.

* * * * *